(12) United States Patent
O'Keeffe et al.

(10) Patent No.: US 8,971,445 B2
(45) Date of Patent: Mar. 3, 2015

(54) METHOD AND APPARATUS FOR EQUALIZING A TRANSMIT CHANNEL FOR CABLE LOSSES IN A C8PSK HART SYSTEM

(75) Inventors: Dermot O'Keeffe, Blarney (IE); Tudor Vinereanu, Cork (IE)

(73) Assignee: Analog Device, Inc., Norwood, MA (US)

( * ) Notice: Subject to any disclaimer, the term of this patent is extended or adjusted under 35 U.S.C. 154(b) by 606 days.

(21) Appl. No.: 13/217,853

(22) Filed: Aug. 25, 2011

(65) Prior Publication Data

US 2013/0051436 A1   Feb. 28, 2013

(51) Int. Cl.
H04K 1/02 (2006.01)
H04L 25/49 (2006.01)
H04L 25/03 (2006.01)
H04L 25/08 (2006.01)
H04L 27/20 (2006.01)

(52) U.S. Cl.
CPC .......... *H04L 25/49* (2013.01); *H04L 25/03343* (2013.01); *H04L 25/08* (2013.01); *H04L 27/2071* (2013.01)
USPC ...................................................... 375/296

(58) Field of Classification Search
CPC . H04L 25/024; H04L 25/03343; H04L 5/005; H04L 1/20; H04L 25/08; H04L 25/49; H04L 27/2071; H04L 27/368; H04L 27/2626; H04L 27/2067; H04L 27/36; H04L 27/367; H03F 1/3241; H04B 1/123; H04B 1/0475; H04B 10/5561
USPC ......... 375/279, 271, 259, 295, 296, 316, 340, 375/229–233; 455/114.2, 114.3
See application file for complete search history.

(56) References Cited

U.S. PATENT DOCUMENTS

| 6,297,691 B1 * | 10/2001 | Anderson et al. ............. 329/300 |
| 2001/0001616 A1 | 5/2001 | Rakib et al. |
| 2002/0172272 A1 | 11/2002 | Kawahara et al. |
| 2009/0010203 A1 | 1/2009 | Pratt et al. |

OTHER PUBLICATIONS

International Search Report and Written Opinion dated Oct. 16, 2012, from PCT/US2012/051873, filed Aug. 22, 2012.

* cited by examiner

*Primary Examiner* — Vineeta Panwalkar
(74) *Attorney, Agent, or Firm* — Kenyon & Kenyon LLP

(57) ABSTRACT

A method to adjust a waveform transmitted from a field device to overcome cable bandwidth limitations by passing data to be transmitted through a channel compensation device which pre-distorts data to be transmitted to compensate for the bandwidth limitations. The predistortion may make sure that there is a good quality signal received at the control end of the cable.

19 Claims, 6 Drawing Sheets

METHOD AND APPARATUS FOR EQUALIZING A TRANSMIT CHANNEL FOR CABLE LOSSES IN A C8PSK HART SYSTEM

BACKGROUND INFORMATION

The present invention relates to the Highway Addressable Remote Transducer ("HART") system, and more specifically to equalizing cable losses in a C8PSK HART system.

The HART protocol is a global standard for sending and receiving digital information across analog wires between intelligent field devices and a control system, and enhancing traditional 4-20 mA signaling by simultaneously allowing two way digital communications. FIG. 1 illustrates a schematic diagram of a HART network. As shown, a HART network 100 includes a control room 101 and a number of field devices 110.1-110.$n$ coupled to the control room 101. The field devices typically are instruments controlled by the control room 101, e.g., pressure sensors, control valves, etc. They collect information in response to a command from the control room 101 and communicate the information back to the control room 101 via the HART protocol. The control room 101 then controls the field device, e.g., 110.1, according to the information received from that field device. With the HART protocol, the control room 101 communicates with field devices to carry out device configuration or reconfiguration, device diagnostics and device troubleshooting without sending an engineer to the field. In FIG. 1, R1-Rn and C1-Cn represent resistance and capacitance of communication lines interconnecting the field devices 110.1-110.$n$ to the control room 101 respectively, and Rsense represents the load of the control room 101 to the network.

Coherent 8-way Phase Shift Keying (C8PSK) is widely used in the telecommunication industry and is known for providing the best balance between faster communications and lower power consumption required for 2-wire field devices.

FIG. 2 illustrates a schematic architecture of a transmitter in a prior art C8PSK HART field device. As shown, the input of a symbol mapping device 201 is coupled to the input of a transmitter 200. The symbol mapping device 201 receives incoming data stream at 9.6 Kbits per second, and divides the data stream into symbols, each of which is a group of three consecutive bits (tribit) and is mapped into a phase angle. The frequency of the output signal of the symbol mapping device 201 is 3.2 KHz.

The input of a look up table (LUT) 202 is coupled to the output of the symbol mapping device 201 to receive the symbols. A symbol is used as a pointer of the LUT 202 to find out the symbol's real and imaginary parts.

A root raised cosine (RRC) filter 203 is coupled to the output of the LUT 202 to receive the imaginary part (Imag) of a symbol, and an RRC filter 204 is coupled to the output of the LUT 202 to receive the real part (Real) of the symbol. The RRC filters 203 and 204 filter the real and imaginary parts of the symbol and output a quadrature phase signal Q and an inphase signal I of the symbol respectively.

One input of a mixer 205 is coupled to the output of the RRC 203 to receive the quadrature phase signal Q, and another input of the mixer 205 receives a carrier $\cos(\omega t)$. The mixer 205 multiplies Q and $\cos(\omega t)$.

One input of a mixer 206 is coupled to the output of the RRC 204 to receive the inphase signal I, and another input of the mixer 206 receives a carrier $\sin(\omega t)$. The mixer 206 multiplies I and $\sin(\omega t)$.

One input of an adder 207 is coupled to the output of the mixer 205 to receive the signal $Q \times \cos(\omega t)$, and another input of the adder 207 is coupled to the output of the mixer 206 to receive the signal $I \times \sin(\omega t)$. The adder 207 combines these two signals together and outputs $Q \times \cos(\omega t) + I \times \sin(\omega t)$, the signal to be transmitted.

A digital to analog converter (DAC) 208 has an input coupled to the output of the adder 207, and converts the signal to be transmitted, $Q \times \cos(\omega t) + I \times \sin(\omega t)$, to an analog signal.

An input of a buffer 209 is coupled to the output of the DAC 208. The analog signal is buffered at the buffer 209 before entering the transmit channel.

The channel characteristics are different for each field device in a HART network, dependent on their distances from the control room. In prior art C8PSK HART systems, the control room does not have data representing the field devices' location and hence does not know the bandwidth of the cable between it and a field device. The cable bandwidth could cause large bit error rates at a control room receiver due to the no-linearity of the cable system.

According to the C8PSK HART protocol, bandwidth limitations of a channel from a control room to a field device can be estimated and equalized by a channel estimation device in a receiver in the field device. However, neither the C8PSK HART standard nor prior art C8PSK HART field devices have transmitter side equalization.

Therefore, it would be desirable to provide a method to adjust the signal from a field device to overcome cable bandwidth limitations and a field device which can compensate for the bandwidth limitations in its transmit channel, and to allow good reception in the control room irrespective of where the field device is in the network.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

The present invention provides a method to adjust a waveform transmitted from a field device to a control room to overcome cable bandwidth limitations by passing the signal to be transmitted through a channel compensation device which pre-distorts the signal to be transmitted to compensate for the bandwidth limitations. The predistortion may improve signal quality when it is received at the control room.

Figure 1:
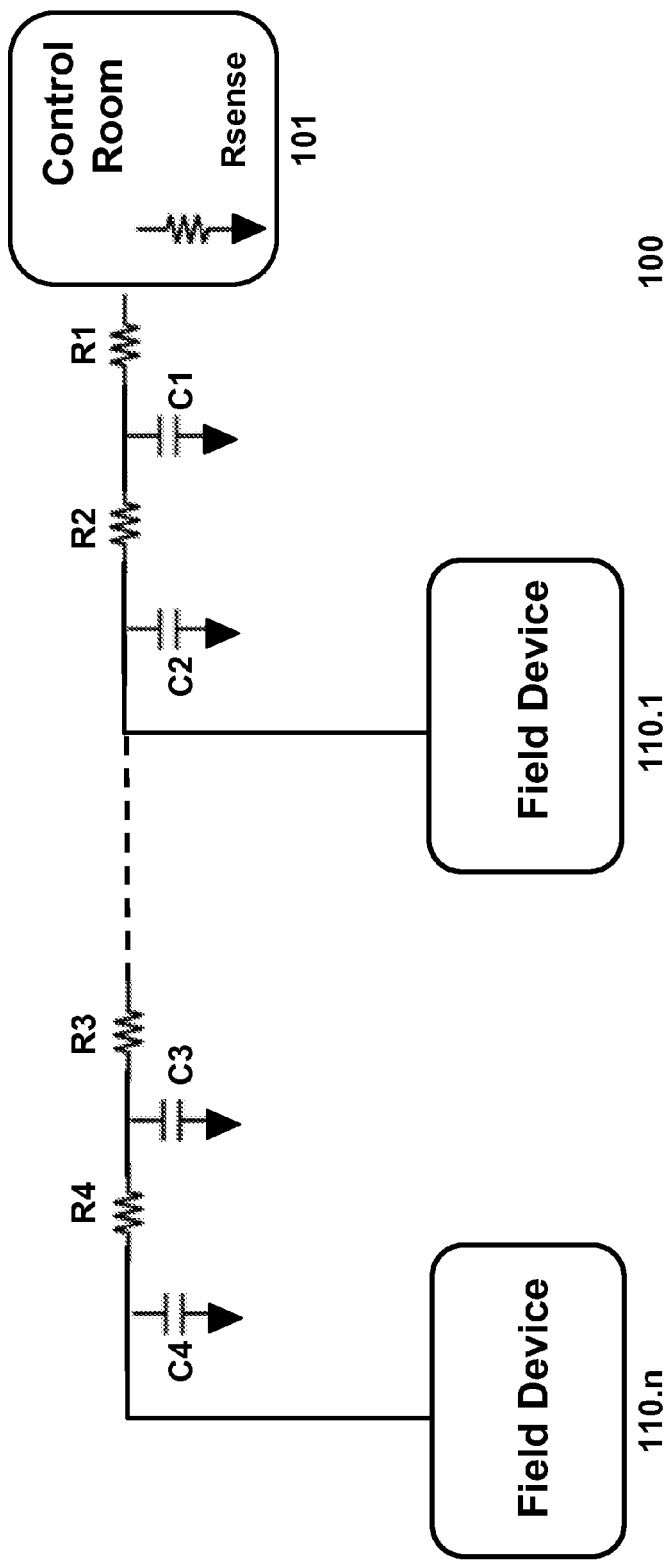
FIG. 1 illustrates a schematic diagram of a HART network.
Figure 2:
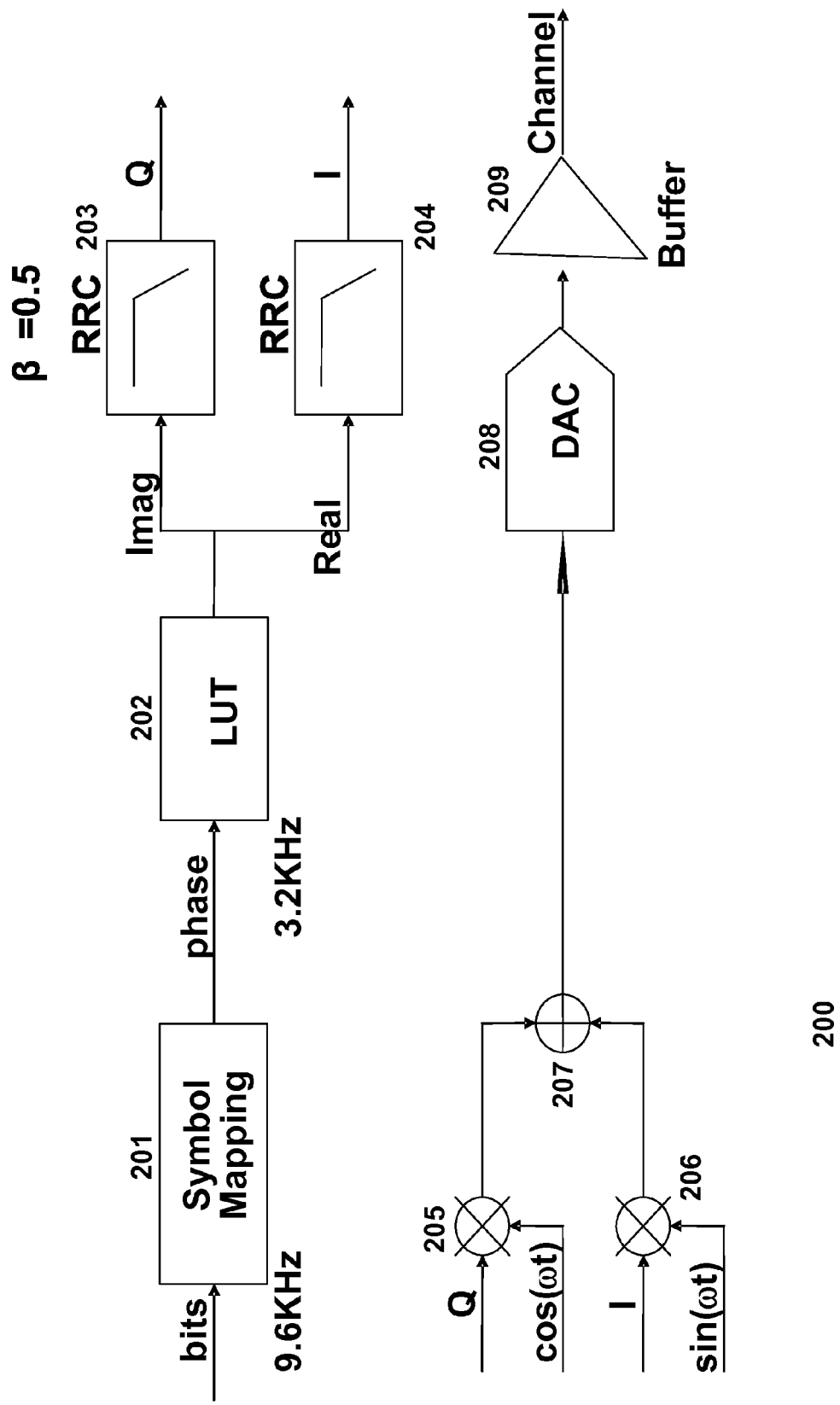
FIG. 2 illustrates a schematic architecture of a transmitter in a prior art C8PSK HART field device.
Figure 3:
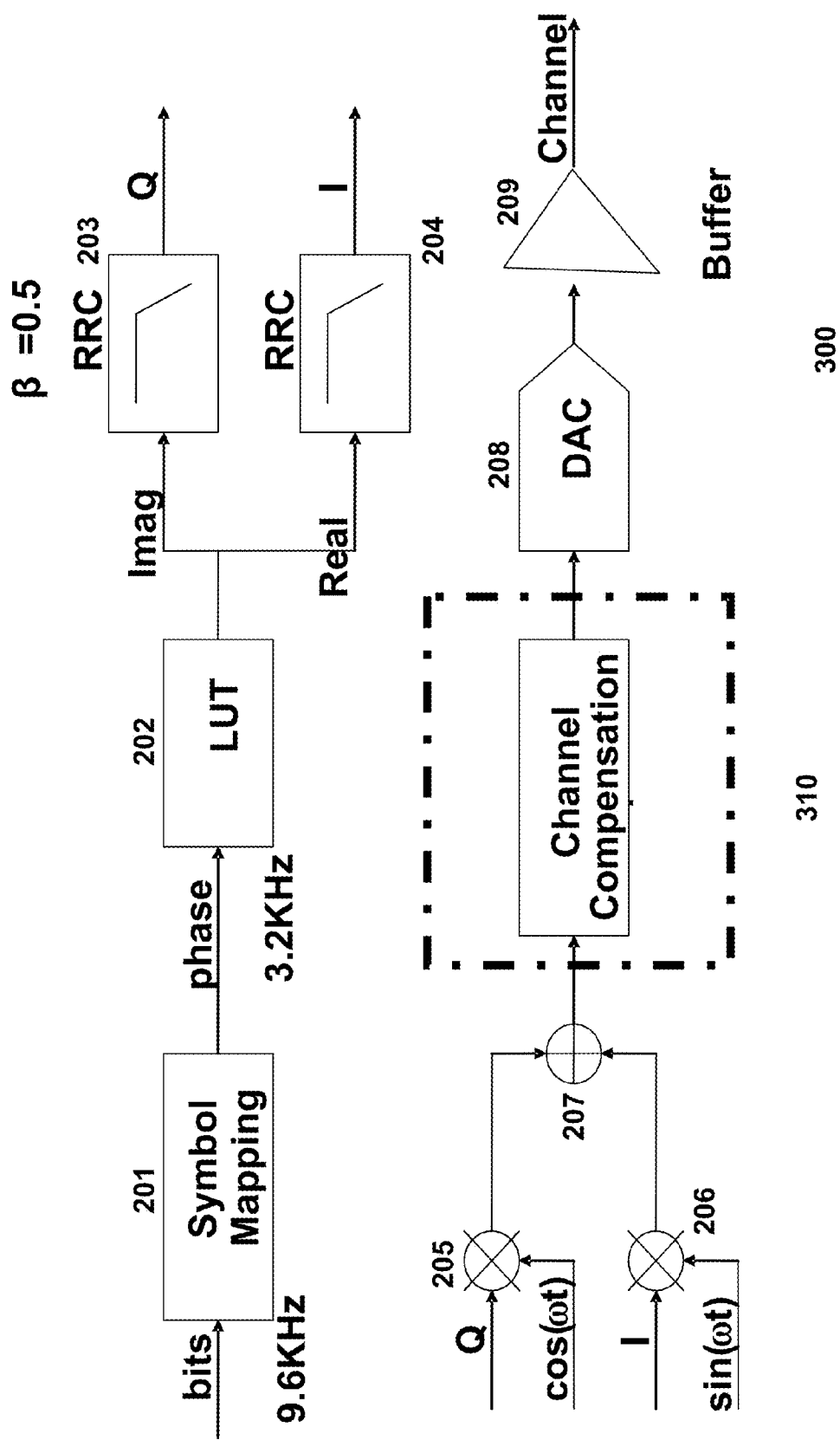
FIG. 3 illustrates a schematic architecture of a transmitter in a C8PSK HART field device according to one embodiment of the present invention.

FIG. 3 illustrates a schematic architecture of a transmitter in a C8PSK HART field device according to one embodiment of the present invention. As shown, a channel compensation device 310 may be added to the transmitter in FIG. 2, with its input coupled to the output of the adder 207 and its output coupled to the input of the DAC 208. The signal to be transmitted may be pre-distorted by the channel compensation device 310 with the channel impairments to compensate for the bandwidth limitations. In one embodiment, the channel compensation device 310 may be an equalizer. For example, the equalizer may be a linear equalizer (e.g., an MMSE (minimum mean square error) equalizer and a zero forcing equalizer), a decision feedback equalizer, a blind equalizer, an adaptive Equalizer, a Viterbi equalizer, a BCR equalizer, or a turbo equalizer. It should be understood that the channel compensation device 310 may be placed in other places in the transmitter, e.g., between the symbol mapping device 201 and the LUT 202.

HART is a master/slave protocol, which means that a smart field device only "speaks" when "spoken to" by a master, which is the control room in the HART system. A HART transaction consists of a master command together with a slave response. The channel impairments obtained by the receiver in a field device may be used in channel compensation in the transmitter in the field device.

Figure 4:
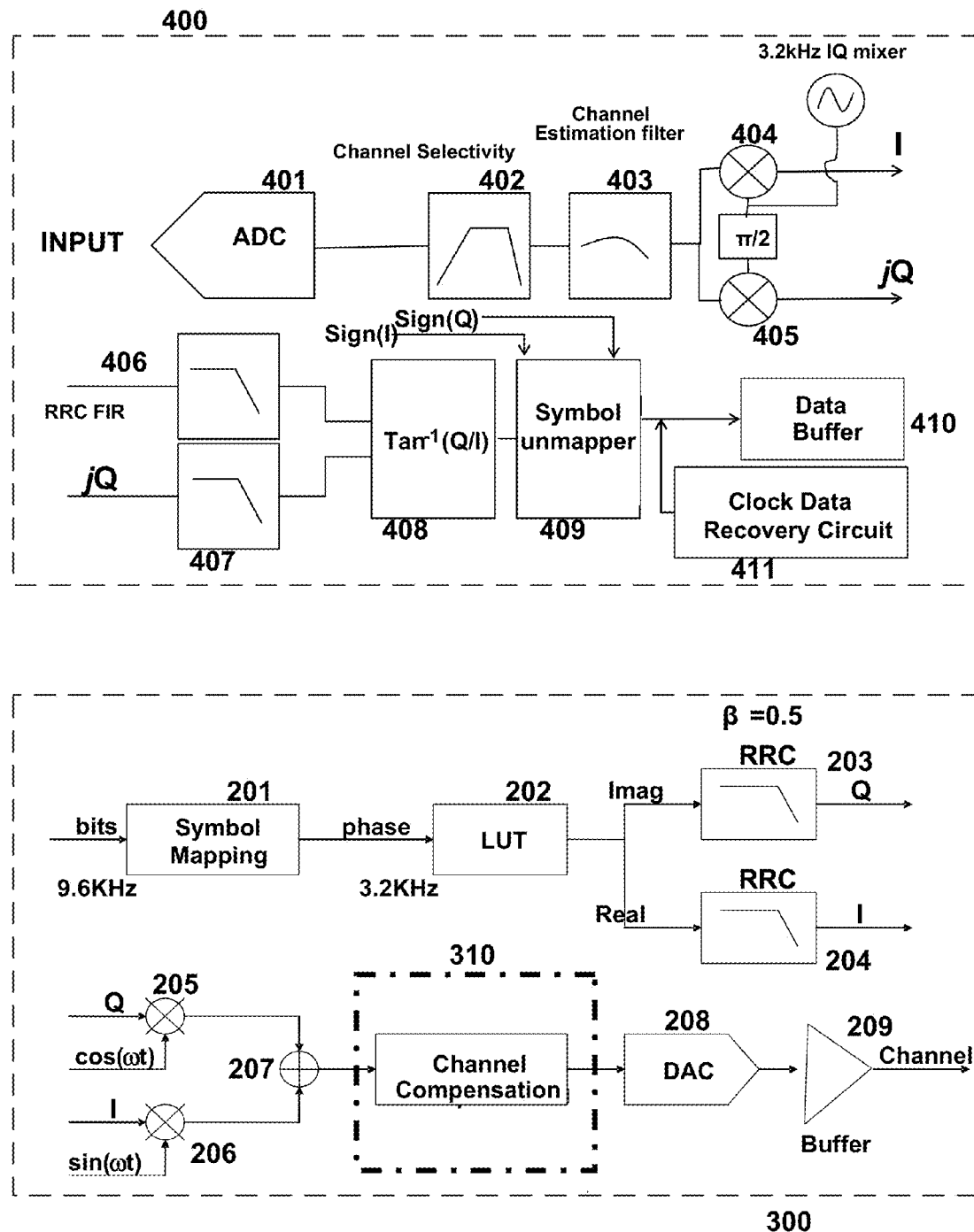
FIG. 4 illustrates a schematic architecture of a C8PSK HART field device's receiver and transmitter according to one embodiment of the present invention.

FIG. 4 illustrates a schematic architecture of a C8PSK HART field device's receiver and transmitter according to one embodiment of the present invention. As shown, at a receiver 400 in a field device 110.$n$, a command from a control room 101 may be converted into a digital signal by an analog-to-digital converter (ADC) 401 and then filtered by a channel selectivity filter 402. A channel estimation device 403 may estimate channel impairments and compensate for the channel impairments before demodulation at mixers 404 and 405. The channel impairments may then be used by the channel compensation device 310 in the transmitter 300 for predistortion before a signal to be transmitted enters the transmit channel.

Specifically, an input of the ADC 401 may be coupled to the input of the receiver 400. The ADC 401 may receive an analog signal from the HART network and convert it into a digital signal.

An input of the channel selectivity filter 402 may be coupled to the output of the ADC 401. The channel selectivity filter 402 may filter the digital signal from the ADC 401 to pass only the wanted signal, i.e., C8PSK HART modulated signal. Out of band signals may be filtered.

The channel estimation device 403 may have an input coupled to the output of the channel selectivity filter 402. The channel estimation device 403 may estimate channel impairments (field abnormalities), including both magnitude and phase impairments, and compensate for the channel impairments.

Table 1 below shows the C8PSK message segments according to the C8PSK HART protocol.

TABLE 1

| Segment | Description | Length (# Symbols) | Sequence |
|---|---|---|---|
| 1 | Preamble | 40 | −67.5°, −67.5°, −67.5°, +67.5°, ..., −67.5°, +67.5° (Symbols: 6, 2, 6, 2, ..., 6, 2) (Unscrambled) |
| 2 | Start Flag | 4 | 112.5°, −157.5°, −67.5°, −157.5° (Symbols: 4, 1, 2, 1) (Unscrambled) |

TABLE 1-continued

| Segment | Description | Length (# Symbols) | Sequence |
|---|---|---|---|
| 3 | HART Frame | Varies | Scrambled HART Message |
| 4 | Stop Flag | 3 | −112.5°, −112.5°, −112.5° (Scrambled Symbols: 0, 0, 0) |

As shown, the preamble of a message has 40 symbols and is a fixed sequence known by the receiver 400. The channel estimation device 403 may compare the sequence it received with the preamble sequence in Table 1 to detect the channel impairments, and compensate for the channel impairments.

In one embodiment, the channel estimation device 403 may be an equalizer. In one embodiment, the equalizer may be a linear equalizer (e.g., an MMSE equalizer and a zero forcing equalizer), a decision feedback equalizer, a blind equalizer, an adaptive Equalizer, a Viterbi equalizer, a BCJR equalizer, or a turbo equalizer.

In one embodiment, the channel estimation device 403 may save the channel impairments in a memory which is accessible by the channel compensation device 310 in the transmitter in the same field device.

In one embodiment, the channel estimation device 403 in the receiver may be applied to the transmitter 300 and used as the channel compensation device 310, so that the channel impairments estimated by the channel estimation device 403 in the receiver 400 of the field device may be used to pre-distort the signal to be transmitted by the transmitter 300 in the field device to the control room 101 to reduce or eliminate errors in the signal received by the control room 101.

Figure 5:
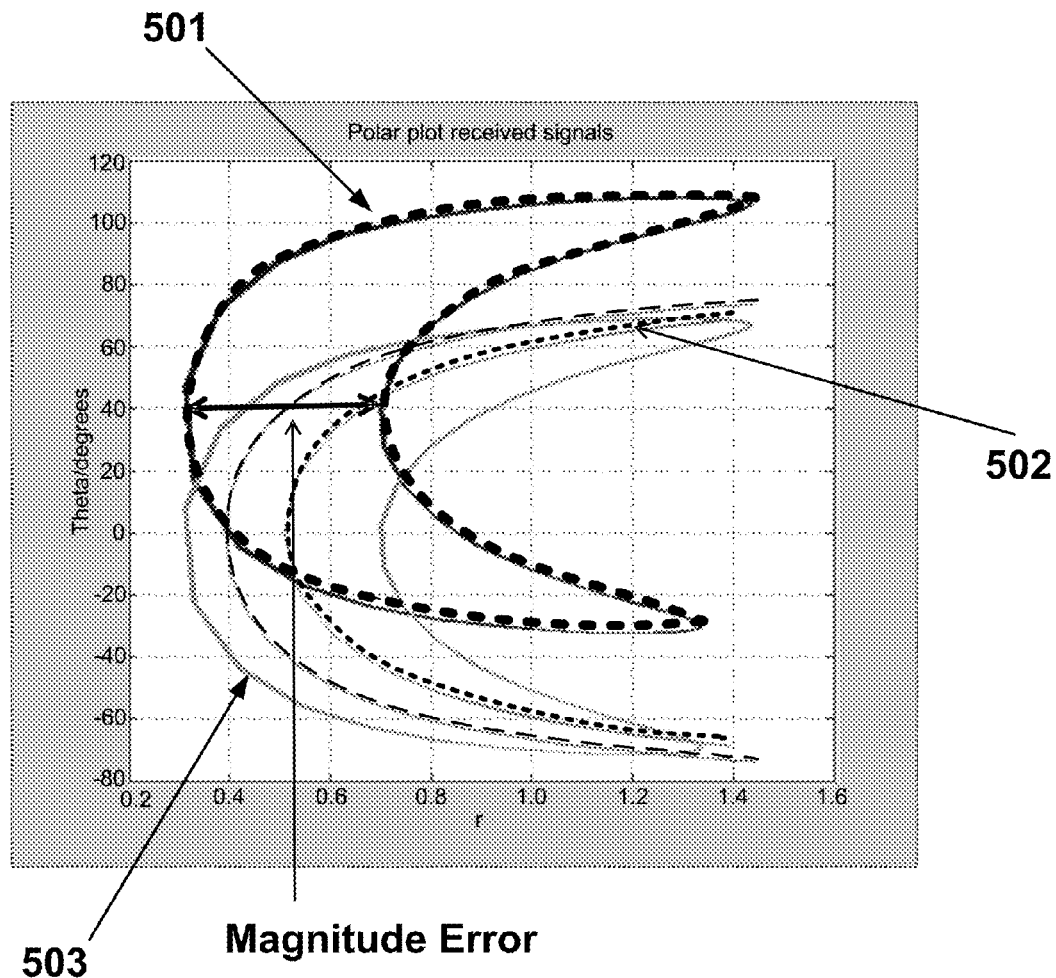
FIG. 5 illustrates simulated signals in a C8PSK HART system.

FIG. 5 illustrates simulated signals in a C8PSK HART system. A signal 501 is a signal received at a receiver 400 in a field device, which is distorted. A signal 502 is an ideal signal, having a symmetric trajectory and ending at +/−67.5°. The channel estimation device 403 may receive the distorted signal 501 at its input, compensate for the channel impairments, and provide the ideal signal 502 at its output. Specifically, the channel estimation device 403 may rotate the distorted signal 501 to shift it down to become a signal 503, and adjust the magnitude of the signal 503 to make it narrower to become the ideal signal 502. In short, the channel estimation device 403 may create a thin rotated signal, that is both corrected for magnitude and phase distortion.

Returning to FIG. 4, the compensated signal from the channel estimation device 403 may then pass through an IQ demodulator for the respective I and Q signals. The IQ demodulator may include mixers 404 and 405. One input of the mixer 404 may be coupled to the output of the channel estimation device 403 to receive the compensated signal, and another input of the mixer 404 may be coupled to a sine carrier. The mixer 404 may output the I signal. One input of the mixer 405 may be coupled to the output of the channel estimation device 403 to receive the compensated signal, and another input of the mixer 405 may receive the sine carrier with a 90° phase shift. The mixer 405 may output the jQ signal.

RRC finite impulse response (FIR) filters 406 and 407 may be coupled to the mixers 404 and 405 to receive the I and jQ signals respectively and filter the signals.

Inputs of a $\text{Tan}^{-1}(Q/I)$ function 408 may be coupled to the outputs of filters 406 and 407 respectively to receive the filtered signals. The $\text{Tan}^{-1}(Q/I)$ function may extract the symbol to find out its angle.

Inputs of a symbol unmapping device 409 may be coupled to the output of the $\text{Tan}^{-1}(Q/I)$ function, and sign(I) and sign(Q). The symbol unmapping device 409 may divide a symbol into 3 bits to reproduce the transmitted bits.

Clock data from a clock data recovery circuit 411 may be applied to the bits from the symbol unmapping device 409, and the bits may then enter a data buffer 410.

The channel impairments detected by the channel estimation device 403 in the receiver 400 may be used to pre-distort the transmit signal. Returning to FIG. 3, the channel compensation device 310 in the transmitter 300 may learn the channel impairments from the channel estimation device 403 in the receiver 400, and then pre-compensate the magnitude and phase of the signal from the adder 207, so that when it is received at the control room it is correct. In one embodiment, the channel compensation device 310's input may be the ideal signal 502 shown in FIG. 5, and its output may be the distorted signal 501 in FIG. 5.

Figure 6:
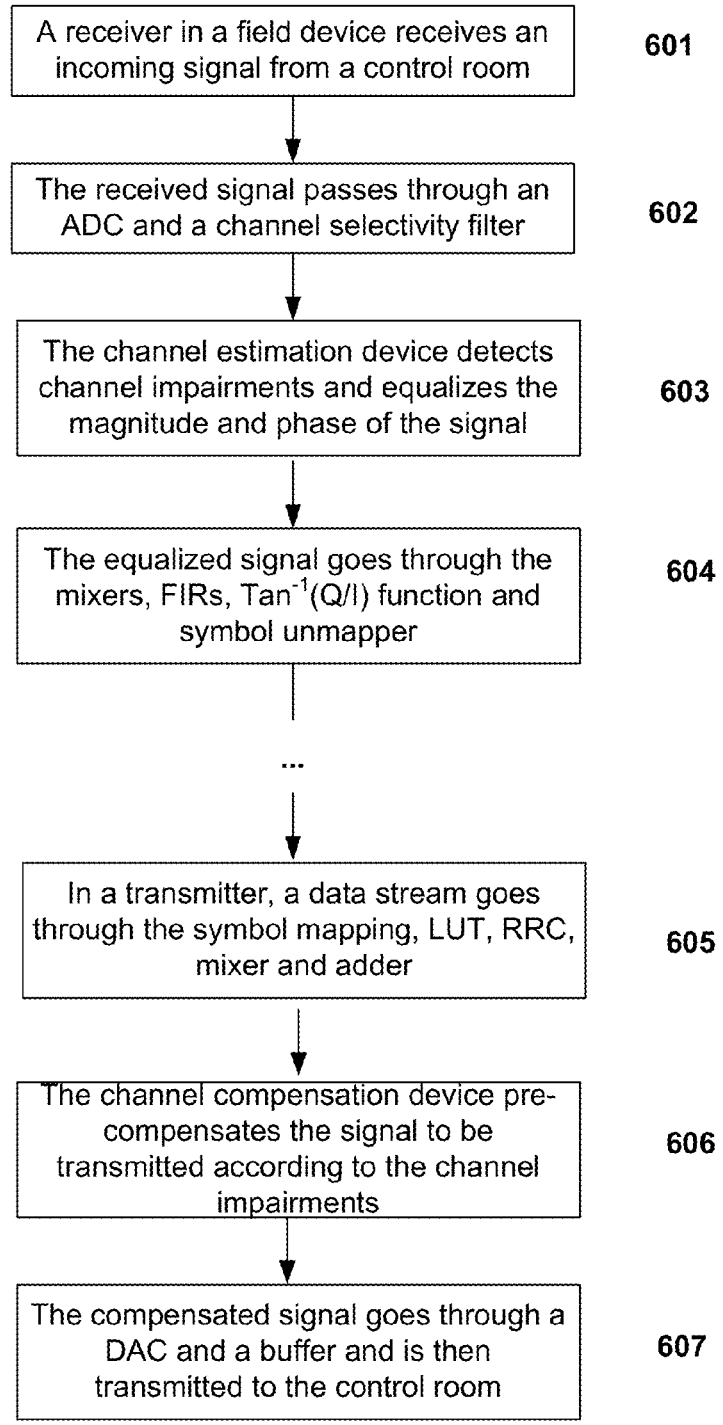
FIG. 6 shows a method of equalizing a transmit channel in a C8PSK HART field device according to one embodiment of the present invention.

FIG. 6 shows a method of equalizing a transmit channel in a C8PSK HART system according to one embodiment of the present invention.

At 601, the receiver 400 in the field device 110.n may receive an incoming signal, a command formatted according to Table 1, from the control room 101.

At 602, the received signal may be converted into a digital signal by the ADC 401, and the digital signal may be filtered by the channel selectivity filter 402 to select the HART signal.

At 603, the channel estimation device 403 may detect the channel impairments by comparing the preamble of the HART signal from the channel selectivity filter 402 and the preamble shown in Table 1, and equalize the magnitude and phase of the HART signal toward the message shown in Table 1.

At 604, the equalized signal may go through mixers 404 and 405, RRC FIRs 406 and 407, the $\tan^{-1}(Q/I)$ function 408, the symbol unmapping device 409 and the data buffer 410, as described above with reference to FIG. 4. The data, which is a command from the control room 101, may then be processed by the field device 110.n.

The field device 110.n may send a data stream back to the control room 101 in response to the command. At 605, at the transmitter in the field device 110.n, the data stream may go though the symbol mapping device 201, the LUT 202, the RRCs 203 and 204, the mixers 205 and 206 and the adder 207, as described above with reference to FIGS. 2 and 3.

At 606, the channel compensation device 310 may pre-distort the signal from the adder 207, which is the signal to be transmitted, according to the channel impairments detected by the channel estimation device 403 in the receiver 400 of the field device.

At 607, the compensated signal may be converted to an analog signal by the DAC 208. The analog signal may then be buffered by the buffer 209 and transmitted back to the control room 101.

Further embodiments are also possible, which are the result of subsets of elements of, or variously combining elements of, embodiments described.

What is claimed is:

1. A field device in a Highway Addressable Remote Transducer (HART) network, comprising:
an input to receive a command, wherein the command is a HART sequence;
a channel estimation device, to compare the received HART sequence with a stored HART sequence of a same type as the received HART sequence, and based on the comparison, to detect channel impairments;
a signal processing device, to divide a data stream into symbols, each symbol including a group of three consecutive bits and to generate an outgoing signal;
a channel predistorter, to pre-distort the outgoing signal with the channel impairments; and
an output to transmit the pre-distorted outgoing signal in response to the command.

2. The field device of claim 1, wherein the channel predistorter is an equalizer.

3. The field device of claim 2, wherein the equalizer is selected from the group consisting of: a linear equalizer, a decision feedback equalizer, a blind equalizer, an adaptive equalizer, a Viterbi equalizer, a Bahl-Cocke-Jelinek-Raviv (BCJR) equalizer, and a turbo equalizer.

4. The field device of claim 3, wherein the linear equalizer is selected from the group consisting of a minimum mean square error (MMSE) equalizer and a zero forcing equalizer.

5. The field device of claim 1, further comprising:
an analog-to-digital converter (ADC), to receive the command signal from the HART network, and to convert the command signal into a digital signal.

6. The field device of claim 1, wherein the channel estimation device compensates for the channel impairments.

7. The field device of claim 1, wherein the HART network is a Coherent 8-way Phase Shift Keying (C8PSK) network.

8. The field device of claim 7, wherein the stored HART sequence is defined in the C8PSK HART protocol.

9. The field device of claim 1, wherein the channel estimation device is an equalizer.

10. The field device of claim 9, wherein the equalizer is selected from the group consisting of: a linear equalizer, a decision feedback equalizer, a blind equalizer, an adaptive equalizer, a Viterbi equalizer, a Bahl-Cocke-Jelinek-Raviv (BCJR) equalizer, and a turbo equalizer.

11. The field device of claim 10, wherein the linear equalizer is selected from the group consisting of a minimum mean square error MMSE equalizer and a zero forcing equalizer.

12. The field device of claim 1, wherein the channel predistorter and the channel estimation device are the same type of device.

13. The field device of claim 1, wherein the channel predistorter is a filter which pre-distorts the magnitude and phase of the outgoing signal based on the channel impairments.

14. A method for reducing channel impairments at a field device in a Highway Addressable Remote Transducer (HART) network, comprising:
receiving a command transmitted from a control room to the field device, wherein the command is a HART sequence;
comparing the received HART sequence with a stored HART sequence of a same type as the received HART sequence;
based on the comparison, detecting channel impairments in the received signal;
mapping a data stream to symbols, each of which comprises three consecutive bits;
modulating the symbols to generate an outgoing signal;
pre-distorting the outgoing signal according to the channel impairments; and
transmitting the pre-distorted signal to the control room.

15. The method of claim 14, further comprising converting the command from the control room into a digital signal.

16. The method of claim 14, wherein the HART network is a Coherent 8-way Phase Shift Keying (C8PSK) HART network.

17. The method of claim 16, wherein the stored HART sequence is defined according to the C8PSK HART protocol.

18. The method of claim 14, further comprising unmapping symbols in the command.

19. The method of claim 14, further comprising converting the pre-distorted signal into an analog signal.

* * * * *